US006205768B1

(12) United States Patent
Dibble et al.

(10) Patent No.: US 6,205,768 B1
(45) Date of Patent: Mar. 27, 2001

(54) CATALYTIC ARRANGEMENT FOR GAS TURBINE COMBUSTOR

(75) Inventors: Robert W. Dibble, Livermore; Rajiv K. Mongia, Berkeley, both of CA (US)

(73) Assignee: Solo Energy Corporation, Alameda, CA (US)

( * ) Notice: Subject to any disclaimer, the term of this patent is extended or adjusted under 35 U.S.C. 154(b) by 0 days.

(21) Appl. No.: 09/304,962

(22) Filed: May 5, 1999

(51) Int. Cl.[7] ............................... F02C 7/10; F23R 3/40
(52) U.S. Cl. ............................................ 60/39.511; 60/723
(58) Field of Search ................................ 60/39.5, 39.511, 60/723, 736

(56) References Cited

U.S. PATENT DOCUMENTS

| 3,928,961 | * | 12/1975 | Pfefferle | 60/723 |
| 4,202,168 | * | 5/1980 | Acheson et al. | 60/723 |
| 4,754,607 | | 7/1988 | Mackay . | |

FOREIGN PATENT DOCUMENTS 6-108879 * 4/1994 (JP) ........................... 60/723

* cited by examiner

Primary Examiner—Louis J. Casaregola
(74) Attorney, Agent, or Firm—Burns, Doane, Swecker & Mathis, L.L.P.

(57) ABSTRACT

A gas turbine system includes a compressor side for compressing an air/fuel mixture, and a turbine side for driving the compressor side. A heat exchanger transfers heat from turbine exhaust gases to the air/fuel mixture from the compressor side. A main catalytic combustor is disposed between the heat exchanger and the turbine side for combusting the air/fuel mixture and supplying the resultant products of combustion to the turbine side. The main catalytic combustor has a volume which is sufficient for oxidizing enough fuel to achieve a predetermined turbine inlet temperature, but insufficient for oxidizing all of the fuel. A secondary catalytic combustor is disposed downstream of the turbine side for combusting at least some of the fuel that was not combusted by the main catalytic combustor. The second catalytic combustor typically operates at a lower temperature than the main catalytic combustor. The secondary catalytic combustor may constitute a separate unit, or it may be integrated with the heat exchanger.

2 Claims, 3 Drawing Sheets

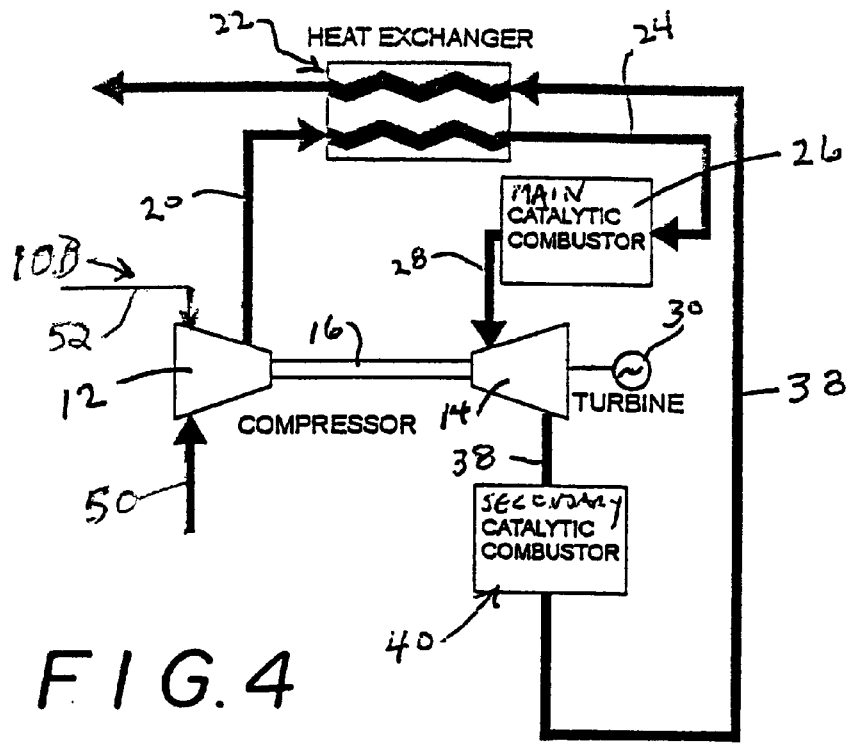
F I G. 4
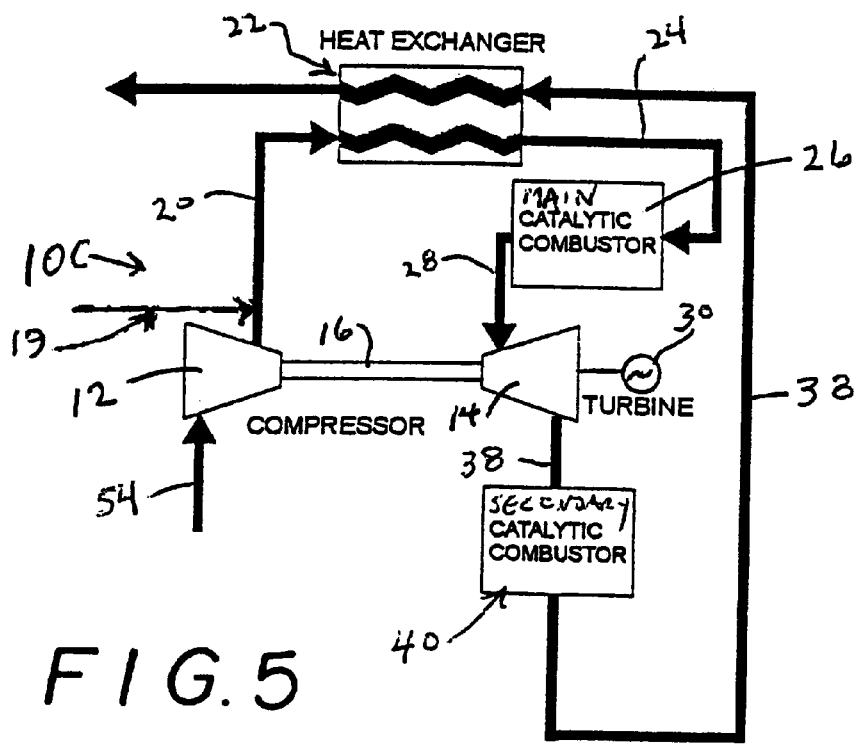
F I G. 5

CATALYTIC ARRANGEMENT FOR GAS TURBINE COMBUSTOR

BACKGROUND OF THE INVENTION

The present invention relates to a gas turbine system of the type in which an air/fuel mixture is reacted in a catalytic combustor.

Gas turbine systems have been previously proposed in which an air/fuel mixture is compressed by a compressor, and then reacted in a catalytic combustor. For example, U.S. Pat. No. 4,754,607 describes a self-contained energy center or cogeneration system which converts chemical energy into mechanical, electrical, and heat energy. The fuel, preferably a gaseous fuel such as natural gas, is mixed with air in a mixer, and then the resulting mixture enters the compressor. The compressor compresses the air/fuel mixture and outputs the compressed mixture to the cold side of a heat exchanger in which the mixture becomes heated. The heated, high-pressure mixture is then delivered to the combustion chamber of a catalytic combustor. The resulting products of combustion are directed to the inlet of an expansion turbine mounted on the compressor shaft. After powering the turbine, the hot combustion gases are directed through the hot side of the heat exchanger, whereupon those gases supply the heat which is transferred to the cooler air/fuel mixture passing through the cold side of the heat exchanger. The still moderately hot combustion gases exiting the hot side of the heat exchanger are delivered to heat-utilizing devices such as a water heater. Meanwhile, the turbine also drives an electric generator mounted on the compressor shaft for producing electric power.

The use of a catalytic combustor offers the advantage that all of the fuel can be oxidized therein, resulting in ultra low $NO_x$ emissions and low CO and UHC (unburned hydrocarbon) levels. However, that requires that the volume of the catalytic combustor be relatively large, which can be rather costly since a substantial portion of the catalyst is exposed to, and must be designed to withstand, temperatures that are very near the turbine inlet temperature (e.g., around 1600° F. or higher).

Therefore, it would be desirable to provide a system in which the total catalytic combustor volume is large enough to oxidize substantially all of the fuel, while minimizing the percentage of the volume which needs to be able to withstand temperatures as high as the turbine inlet temperature.

SUMMARY OF THE INVENTION

The present invention relates to an energy producing apparatus which comprises a compressor side for compressing an air/fuel mixture, and a turbine side for driving the compressor side. An energy take-off device is driven by the turbine side. A main catalytic combustor is disposed between the compressor side and the turbine side for combusting the air/fuel mixture that has been compressed by the compressor side, and supplying the resulting products of combustion to the turbine side. The main catalytic combustor has a volume which is sufficient for oxidizing enough of the fuel to achieve a predetermined turbine inlet temperature, and insufficient for oxidizing all of the fuel. A secondary catalytic combustor is disposed downstream of the turbine side for receiving turbine exhaust gases and combusting at least some of the fuel therein that was not oxidized by the main catalytic combustor. The secondary catalytic combustor operates at a lower temperature than the main catalytic combustor.

A heat exchanger is preferably arranged to receive turbine exhaust gases from the secondary catalytic combustor. The heat exchanger transfers heat to the compressed air/fuel mixture which is being conducted to the main catalytic combustor.

Alternatively, the secondary catalytic combustor can be integrated in the heat exchanger.

BRIEF DESCRIPTION OF THE DRAWINGS

The objects and advantages of the invention will become apparent from the following detailed description of a preferred embodiment thereof in connection with the accompanying drawing in which like numerals designate like elements and in which:

FIG. 4 is a schematic illustration of a third preferred embodiment of the invention; and FIG. 5 is a schematic illustration of a fourth preferred embodiment of the invention.

DETAILED DESCRIPTION OF A PREFERRED EMBODIMENT OF THE INVENTION

Figure 1:
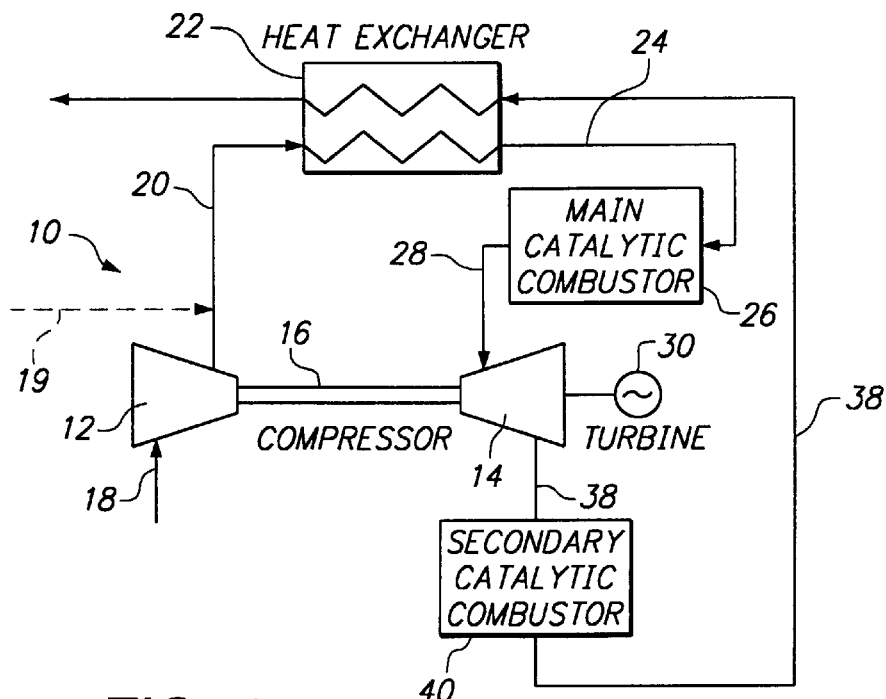
FIG. 1 is a schematic illustration of a gas turbine system according to a first embodiment of the invention.

A gas turbine system 10 depicted in FIG. 1 could be a cogeneration system of the type described in U.S. application Ser. No. 09/034,259, filed Mar. 4, 1998 (the disclosure of which being incorporated by reference herein) wherein chemical energy is converted into mechanical, electrical and/or heat energy. The compressor side includes a compressor 12, and the turbine side includes a main turbine 14 mounted on a common shaft 16. During steady state operation, a steady state air/fuel mixture is aspirated into the compressor inlet via conduit 18, due to the low pressure at that inlet. Alternatively, in a system 10B depicted in FIG. 4, the air and fuel are supplied separately to the compressor via lines 50 and 52, respectively, and compressed therein. In another alternative system 10C, depicted in FIG. 5, the fuel is pressurized and mixed via line 19 with compressed air exiting the compressor, the air having been delivered to the compressor via line 54.

The air/fuel mixture is compressed in the compressor and then conducted via conduit 20 to the cold side of a heat exchanger 22, preferably a recuperator type of heat exchanger, although a regenerator type of heat exchanger as disclosed in U.S. application Ser. No. 09/034,394, filed Mar. 4, 1998 could be used. As it passes through the heat exchanger, the compressed air/fuel mixture is heated and then conducted to a main catalytic combustor 26 via conduit 24. The hot, compressed air/fuel mixture is combusted in the main catalytic combustor, and the resulting products of combustion are directed via conduit 28 to the inlet of the main expansion turbine 14. The turbine 14 could drive one or more energy take-off devices, such as an electrical generator 30 for producing electrical energy. After powering the turbine 32, the gases are conducted via conduit 38 through the hot side of the heat exchanger 22 to supply the heat which is transferred to the earlier-mentioned cooler air/fuel mixture passing through the cold side of the heat exchanger 22. The moderately hot gases exiting the hot side of the heat exchanger 22 could be delivered to one or more heat-utilizing devices such as a hot water heater (not shown).

The main catalytic combustor 26 is of sufficient volume to combust some, but not all, of the fuel. That is, the volume is sufficient to combust enough of the fuel to achieve a predetermined turbine inlet temperature (e.g., 1600° F. or higher) but of insufficient volume to combust all of the fuel.

A secondary catalytic combustor 40 is disposed downstream of the turbine side in order to combust at least some of the fuel that was not combusted in the main catalytic combustor, i.e., to oxidize the CO and UHC in the exhaust gases prior to their exiting the turbine. The secondary catalytic combustor combusts at least enough of that fuel to achieve levels of unburned hydrocarbon emissions required to comply with applicable environmental regulations. It will be appreciated that the secondary catalytic combustor is exposed to a lower temperature than the main catalytic combustor, i.e., the secondary catalytic combustor is exposed to the turbine exhaust temperature, on the order of 1200° F., and thus is less expensive per volume to produce as compared with the main catalytic combustor, since the secondary catalytic combustor is designed to withstand lower temperatures.

Figure 2:
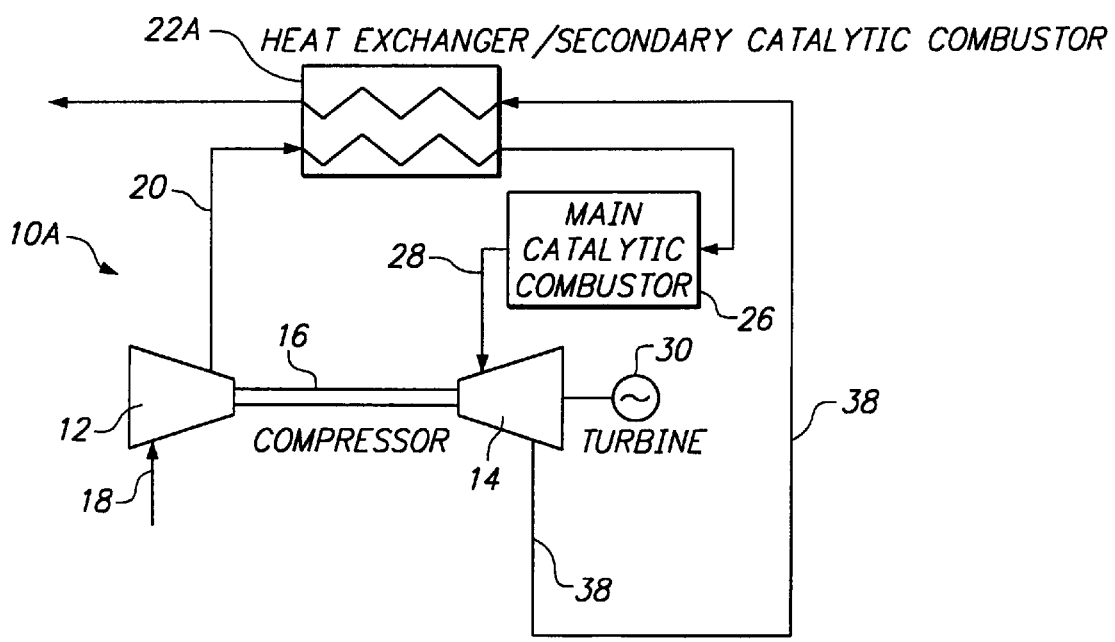
FIG. 2 is a view similar to FIG. 1 of a second preferred embodiment of the invention.
Figure 3:
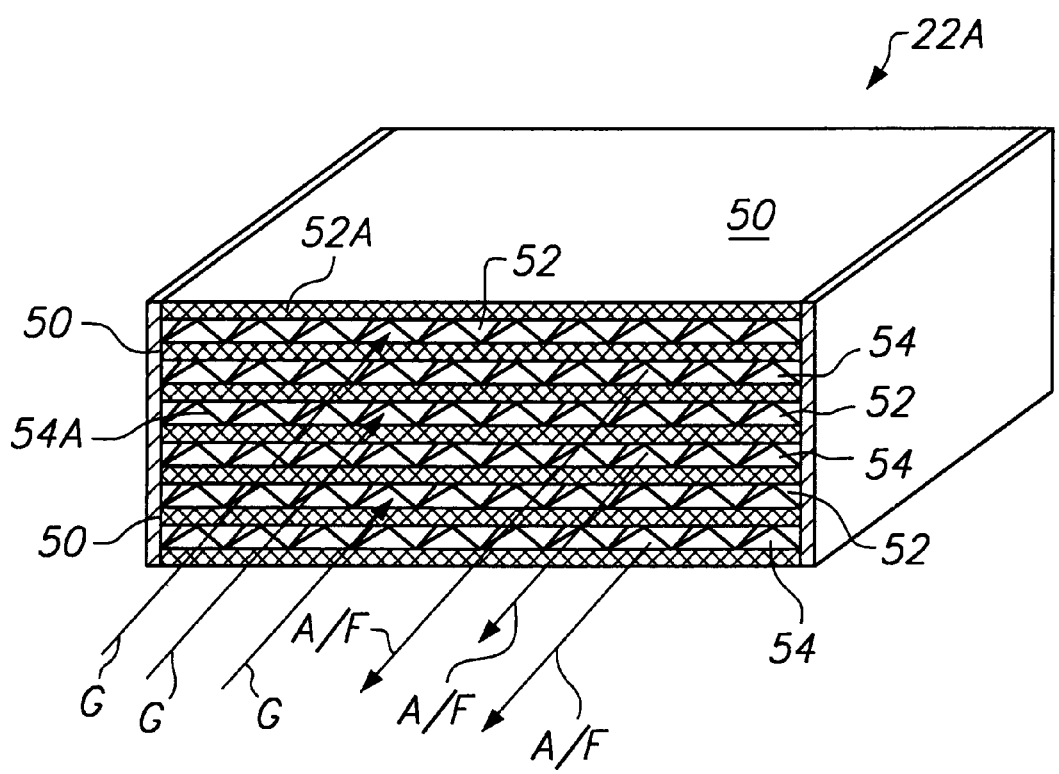
FIG. 3 is a schematic perspective view of a heat exchanger/catalytic combustor utilized in the embodiment depicted in FIG. 2.

In a system 10A according to a second embodiment of the invention, depicted in FIGS. 2 and 3, the secondary catalytic combustor is integrated with the heat exchanger 22A. The heat exchanger 22A comprises a plurality of spaced apart plates forming between one another a series of spaces, i.e., spaces 52 alternating with spaces 54. Each of the spaces contains corrugated metal heat-transfer sheets 52A or 54A. The spaces 52 are connected to the conduit 38 for conducting turbine exhaust gases G, whereas the other spaces 54 are connected to the conduit 20 to conduct compressed air/fuel mixture in counterflow relationship to the exhaust gases. In that way, heat is transferred from the turbine exhaust gases to the air/fuel mixture. The corrugated metal sheets 52A are coated with catalytic material, such as palladium or platinum for example, whereby the heat exchanger performs the function of oxidizing fuel that was not oxidized in the main catalytic combustor 26. In other words, the heat exchanger 22A constitutes not only a heat exchanger performing the heat exchanging function performed by the heat exchanger 22 of FIG. 1, but also constitutes a secondary catalytic combustor performing the secondary oxidation function (i.e., the function performed by the secondary catalytic combustor 40 of the FIG. 1). Thus, the costs of the system are reduced even further since there is no need for a separate secondary catalytic combustor, nor for associated charges, housings, holders, and ducts that would be needed.

It will be appreciated that the present invention provides an energy-producing turbine system wherein substantially all of the fuel is oxidized while the portion of the volume of the catalytic combustor that needs to withstand the turbine inlet temperature is minimized.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An energy producing apparatus comprising:

compressor mechanism for compressing air and fuel;

an energy take-off device;

turbine mechanism for driving the compressor mechanism and the energy take-off device;

a main catalytic combustor disposed between an outlet of the compressor mechanism and an inlet of the turbine mechanism for combusting the air/fuel mixture compressed by the compressor mechanism and supplying the resulting products of combustion to the turbine side for driving the turbine mechanism, the main catalytic combustor having a volume sufficient for oxidizing enough of the fuel to achieve a predetermined turbine inlet temperature, and insufficient for oxidizing all of the fuel;

a secondary catalytic combustor disposed downstream of the turbine mechanism for receiving turbine exhaust gases and combusting at least some of the fuel therein that was not combusted by the main catalytic combustor; and a heat exchanger arranged to receive turbine exhaust gases from the secondary catalytic combustor and for transferring heat therefrom to the compressed air/fuel being conducted to the main catalytic combustor, a passage extending from the turbine mechanism to the heat exchanger for conducting the exhaust gases being free of turbine mechanism.

2. The energy producing apparatus according to claim 1 further including an air inlet line for conducting air into the compressor mechanism, and a fuel inlet line for conducting fuel into the compressor separately from the air.

* * * * *